(12) United States Patent
Takahata

(10) Patent No.: US 9,190,661 B2
(45) Date of Patent: Nov. 17, 2015

(54) SECONDARY BATTERY AND METHOD FOR PRODUCING SECONDARY BATTERY

(75) Inventor: Koji Takahata, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 17 days.

(21) Appl. No.: 14/116,441

(22) PCT Filed: May 10, 2011

(86) PCT No.: PCT/JP2011/060771
§ 371 (c)(1),
(2), (4) Date: Nov. 8, 2013

(87) PCT Pub. No.: WO2012/153393
PCT Pub. Date: Nov. 15, 2012

(65) Prior Publication Data
US 2014/0080005 A1   Mar. 20, 2014

(51) Int. Cl.
| | |
|---|---|
| *H01M 4/13* | (2010.01) |
| *H01M 4/36* | (2006.01) |
| *H01M 4/133* | (2010.01) |
| *H01M 4/1393* | (2010.01) |
| *H01M 4/587* | (2010.01) |
| *H01M 4/04* | (2006.01) |

(52) U.S. Cl.
CPC .............. *H01M 4/364* (2013.01); *H01M 4/04* (2013.01); *H01M 4/133* (2013.01); *H01M 4/1393* (2013.01); *H01M 4/587* (2013.01); *Y02E 60/122* (2013.01); *Y10T 29/49115* (2015.01)

(58) Field of Classification Search
CPC ..... H01M 4/04; H01M 4/133; H01M 4/1393; H01M 4/364; H01M 4/587; Y02E 60/122; Y10T 29/49115
USPC .............................. 429/209, 212, 231.95, 249
See application file for complete search history.

(56) References Cited

FOREIGN PATENT DOCUMENTS

| | | | |
|---|---|---|---|
| JP | 2002-100410 | 4/2002 | |
| JP | 2009-176448 | 8/2009 | |
| JP | 2011-54371 | 3/2011 | |
| JP | 2011-054371 | * 3/2011 | ........ H01M 10/0525 |

* cited by examiner

*Primary Examiner* — Patrick Ryan
*Assistant Examiner* — Ben Lewis
(74) *Attorney, Agent, or Firm* — Finnegan, Henderson, Farabow, Garrett & Dunner, LLP

(57) ABSTRACT

A secondary battery is provided with a negative electrode sheet including a negative active material layer including negative active material particles. The negative active layer contains, as the negative active material particles, graphite particles formed from graphite and amorphous carbon particles formed from amorphous carbon. The difference ($\Delta S$) (=Sb−Sa) in specific surface area between the specific surface area (Sb) of the amorphous carbon particles and the specific surface area (Sa) of the graphite particles is −0.3 to 2.6 m$^2$/g.

2 Claims, 9 Drawing Sheets

SECONDARY BATTERY AND METHOD FOR PRODUCING SECONDARY BATTERY

CROSS-REFERENCE TO RELATED APPLICATIONS

This application is a national phase application of International Application No. PCT/JP2011/060771, filed May 10, 2011, the content of which is incorporated herein by reference.

TECHNICAL FIELD

The present invention relates to a secondary batter including a negative electrode sheet having a negative active material layer containing negative active material particles and a method for producing this secondary battery.

BACKGROUND ART

There is conventionally known a secondary battery including a negative electrode sheet having a negative active material layer containing negative active material particles. As the negative active material particles, known are particles made of carbon such as graphite. It is also known that the negative active material layer is made of two kinds of negative active material particles made of carbon. For example, Patent Document 1 listed below discloses forming a negative active material layer from negative active material particles made of low-temperature calcined or baked carbon obtained in such a manner that volatile organic substances or the like obtained from carbon and petroleum pitch are calcined at a temperature of 1000° C. or less, and negative active material particles made of fibrous carbon material or graphite (see claims and others of Patent Document 1). It is disclosed that the negative active material layer formed as above enables improvement of a capacity retention rate in a cycle test in which charge and discharge at a low rate (e.g., a current value of 1 C) are repeated in a wide SOC range.

Patent Document 2 for example discloses forming a negative active material layer from negative active material particles made of graphitizable carbon material obtained by calcining or baking petroleum pitch, polyacene, polysiloxane, etc. at 800° C. to 1000° C. and negative active material particles made of non-graphitizable carbon material obtained by calcining or baking petroleum pitch, polyacene, polysiloxane, etc. at 500° C. to 800° C. (see claims and others of Patent Document 2). It is disclosed that the negative active material layer formed as above enables suppression of deterioration in the capacity of a secondary battery and improvement of a capacity retention rate in a cycle test in which charge and discharge at a low rate (e.g., a current value of 1 C) are repeated in a wide SOC range.

RELATED ART DOCUMENTS

Patent Documents

Patent Document 1: JP 2002-100410A
Patent Document 2: JP 2009-176448A

SUMMARY OF INVENTION

Problems to be Solved by the Invention

However, even when the negative active material layer is formed of two kinds of negative active material particles made of carbon as disclosed in Patent Documents 1 and 2 may still cause deterioration in durability of secondary batteries. Specifically, if the secondary batteries in Patent Documents 1 and 2 are subjected to a "high-rate discharge cycle test" in which charge and discharge are repeated so that at least discharge is performed at high rates in a short time, for example, in which discharge at 30 C for 10 seconds and charge at 30 C for 10 seconds are repeated, battery resistance is greatly increased as compared to that before the test.

The present invention has been made in view of the circumstances and has a purpose to provide a secondary battery capable of suppressing an increase in battery resistance and providing good durability even after charge and discharge including high-rate discharge are repeated, and a method for easily producing this secondary battery.

Means of Solving the Problems

To achieve the above purpose, one aspect of the invention provides a secondary battery including a negative electrode sheet having a negative active material layer containing negative active material particles, wherein the negative active material layer contains, as the negative active material particles, graphite particles made of graphite and amorphous carbon particles made of amorphous carbon, and a specific surface area Sb of the amorphous carbon particles and a specific surface area Sa of the graphite particles are determined so that a difference $\Delta S$ (=Sb−Sa) between the specific surface areas is −0.3 to 2.6 $m^2/g$.

The above secondary battery can suppress an increase in battery resistance and provide good durability even after charge and discharge including high-rate discharge are repeated.

In the above secondary battery, preferably, the difference $\Delta S$ in the specific surface area is 0 to 2.1 $m^2/g$.

In any one of the above secondary batteries, preferably, the specific surface area Sa of the graphite particles is 1.0 to 8.0 $m^2/g$.

In any one of the above secondary batteries, preferably, the specific surface area Sb of the amorphous carbon particles is 2.0 to 10.0 $m^2/g$.

Another aspect of the invention provides a method for producing a secondary battery including a negative electrode sheet having a negative active material layer containing negative active material particles, wherein the negative active material layer contains, as the negative active material particles, graphite particles made of graphite and amorphous carbon particles made of amorphous carbon, and a specific surface area Sb of the amorphous carbon particles and a specific surface area Sa of the graphite particles are determined so that a difference $\Delta S$ (=Sb−Sa) between the specific surface areas is −0.3 to 2.6 $m^2/g$, wherein the method includes: a negative active material paste preparing step of preparing a negative active material paste; and a negative electrode sheet forming step of forming the negative electrode sheet by forming the negative active material layer by use of the negative active material paste, the negative active material paste preparing step includes: an active material mixing step of mixing the graphite particles and the amorphous carbon particles to produce a mixture of the negative active material particles; and a pasting step of making the mixture of the negative active material particles into paste to produce the negative active material paste.

According to this method for producing the secondary battery, the aforementioned secondary battery can be easily produced.

REFERENCE SIGNS LIST

Figure 1:
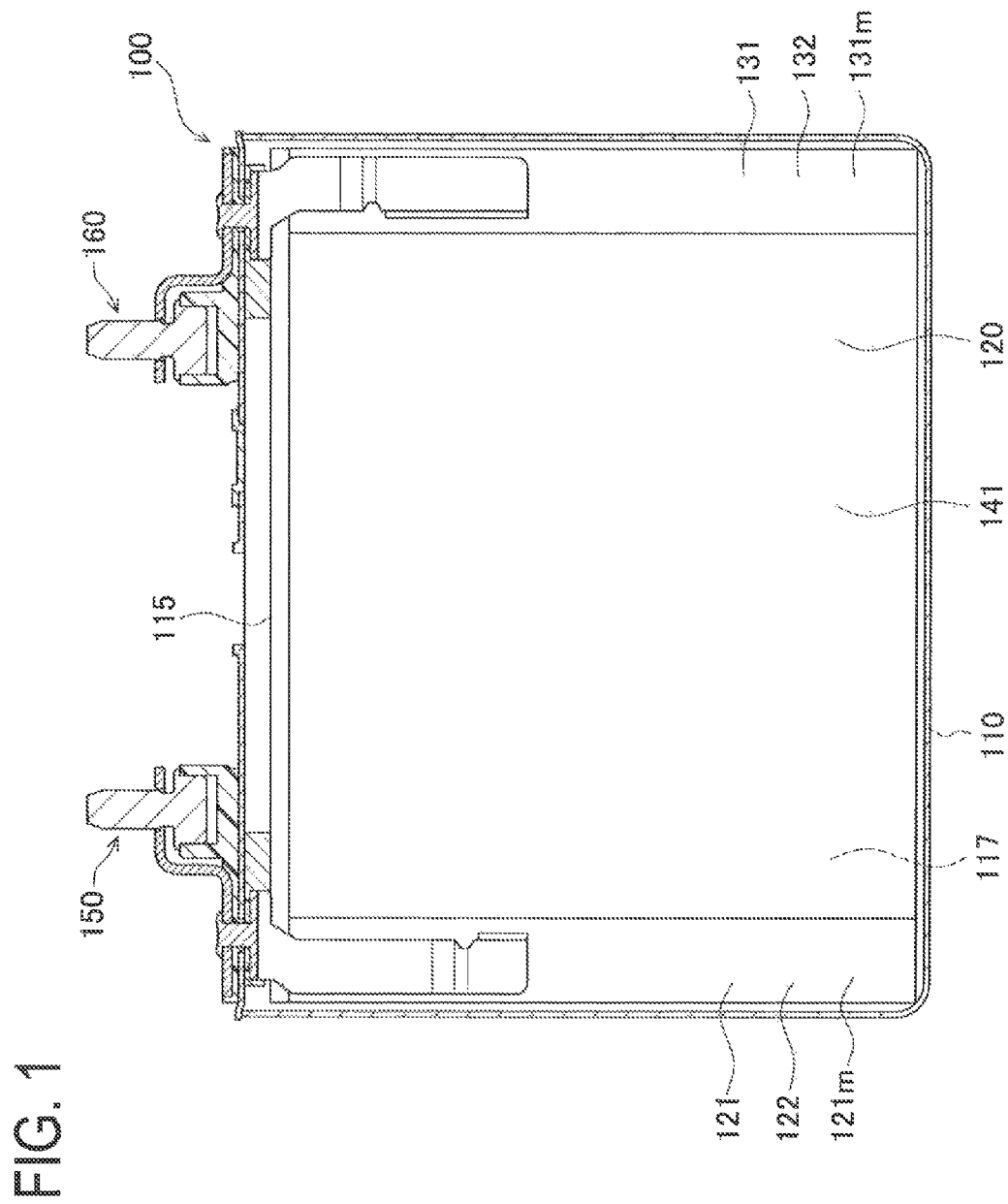
FIG. 1 is a longitudinal sectional view of a lithium ion secondary battery in a first embodiment.

100 Lithium ion secondary battery (Secondary battery)
120 Wound electrode body
121 Positive electrode sheet
131 Negative electrode sheet
132 Negative current collecting foil
133 Negative active material layer
135 Negative active material particles
135a Graphite particles
135b Amorphous carbon panicles
141 Separator
700 Hybrid car (Vehicle)
800 Hammer drill (Battery-using device)

MODE FOR CARRYING OUT THE INVENTION

First Embodiment

Figure 2:
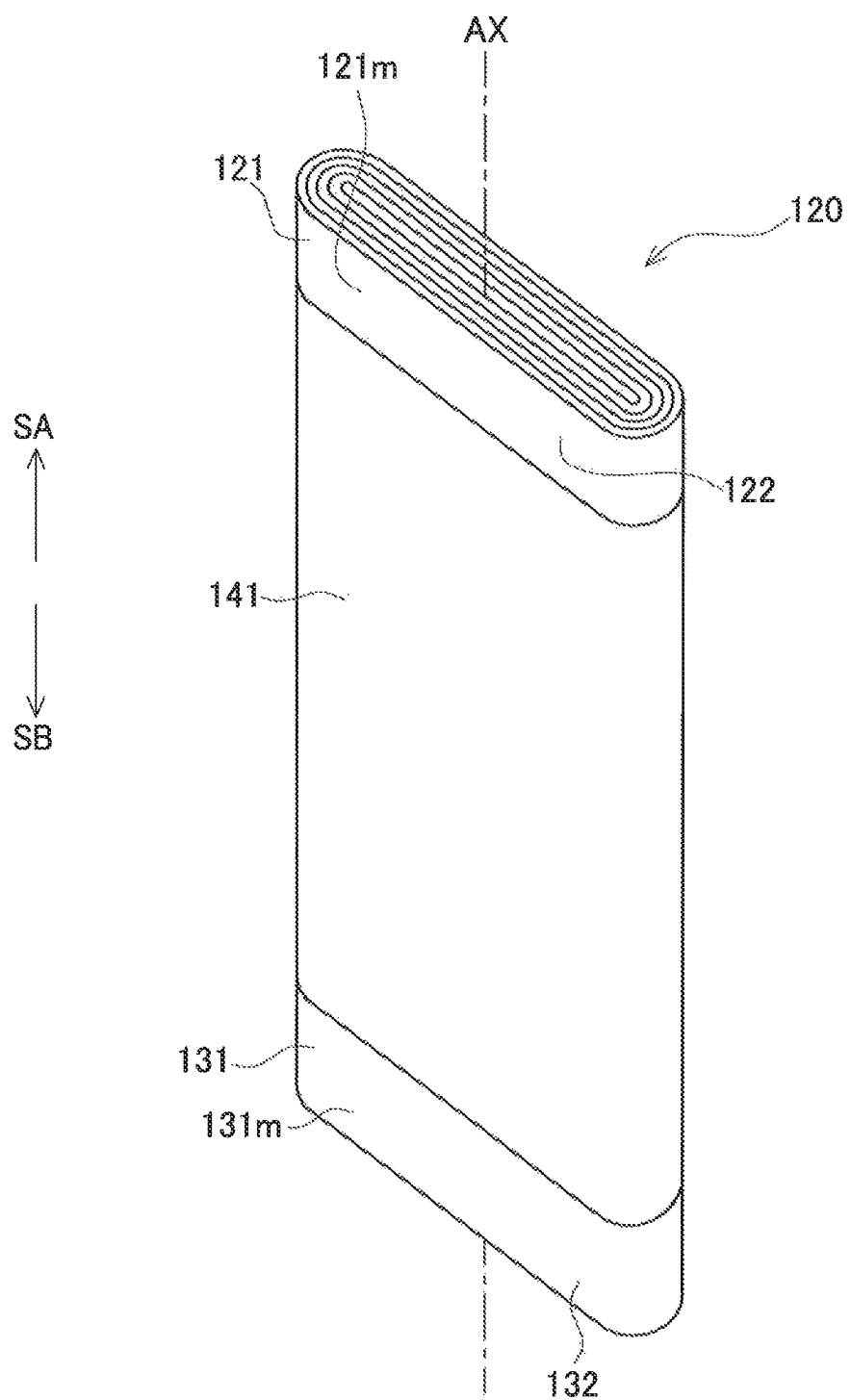
FIG. 2 is a perspective view of a wound electrode body in the first embodiment.
Figure 3:
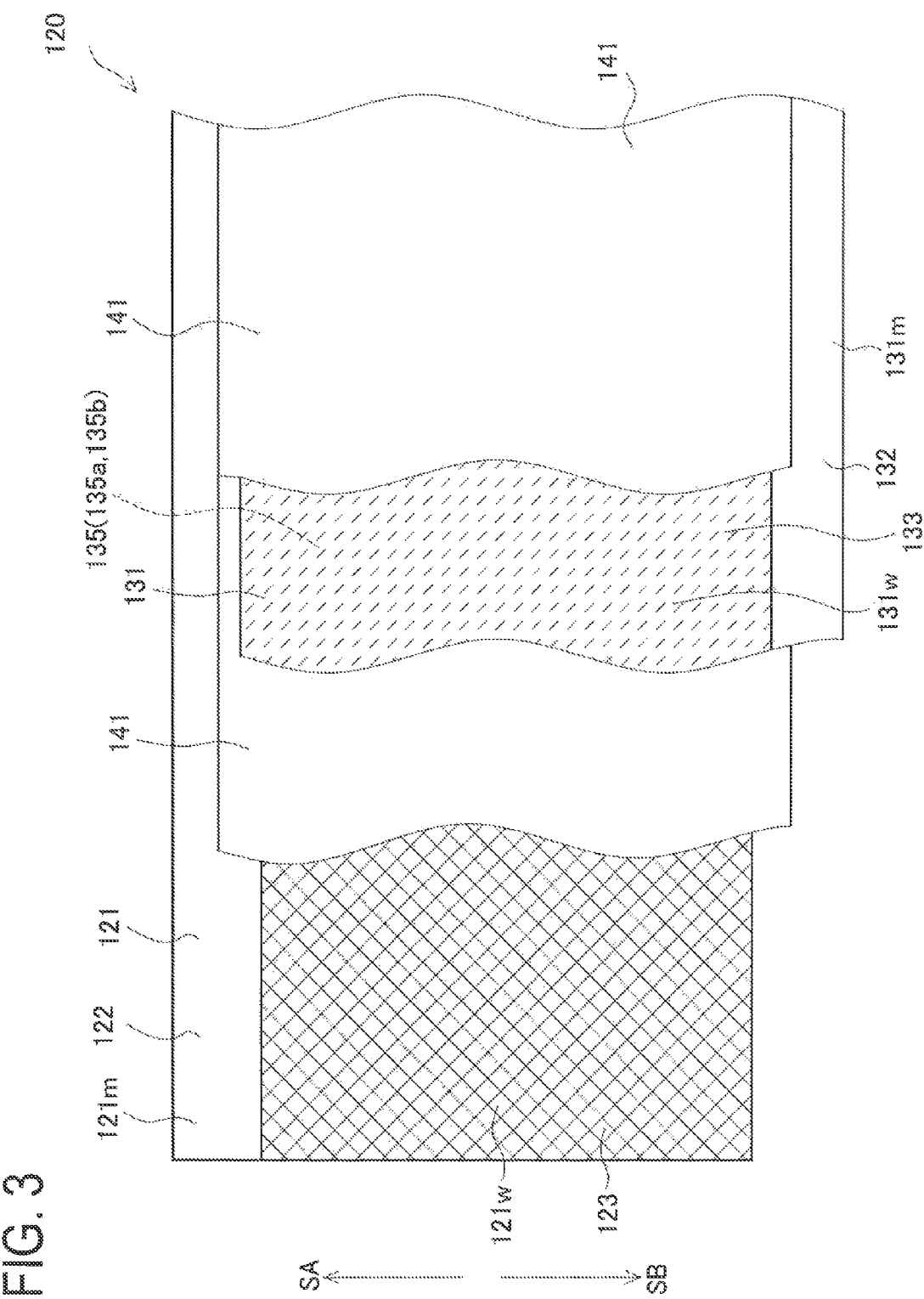
FIG. 3 is partial plan view showing a positive electrode sheet and a negative electrode sheet in laminated state by interposing separators therebetween in the first embodiment.

A detailed description of a preferred embodiment of the present invention will now be given referring to the accompanying drawings. FIG. 1 illustrates a lithium ion secondary battery (a secondary battery) 100 in the first embodiment. FIG. 2 illustrates a wound electrode body 120 forming the lithium ion secondary battery 100. Further, FIG. 3 illustrates a developed state of this electrode body 120.

The lithium ion secondary battery 100 (hereinafter, also simply referred to as a secondary battery 100) is a rectangular battery which will be mounted in a vehicle such as a hybrid car and an electric car, or a battery-using device such as a hammer drill. This secondary battery 100 includes a rectangular battery case 110, a wound electrode body 120 accommodated in this battery case 110, and a positive electrode terminal 150 and a negative electrode terminal 160 supported in the battery case 110 (see FIG. 1). The battery case 110 contains non-aqueous electrolyte 117.

This electrode body 120 is enclosed in an insulation film envelope 115 formed of an insulation film in a sack-like shape opening only in the upper side, and further accommodated in a sideways position in the battery case 110 (see FIG. 1). This electrode body 120 is configured so that a strip-shaped positive electrode sheet 121 and a strip-shaped negative electrode sheet 131 are laminated one on top of the other by interposing strip-shaped separators 141 therebetween (see FIG. 3) and wound around an axis line AX and then compressed into a flattened shape (see FIG. 2).

The positive electrode sheet 121 includes, as a core member, a positive current collecting foil 122 made of a strip-shaped aluminum foil. Of both main surfaces of this positive current collecting foil 122, regions which are part in a width direction and extending a longitudinal direction (in a right-and-left direction in FIG. 3) are provided with strip-shaped positive active material layers 123, 123 in the longitudinal direction. Those positive active material layers 123 are each formed of positive active material particles, a conductive material, and a binding material (a binder). In the first embodiment, the positive active material particles are active material particles made of $LiNi_{1/3}Co_{1/3}Mn_{1/2}O_2$, the conductive material is acethylene black (AB), and the binder is polyvinylidene fluoride (PVDF).

A strip-shaped portion of the positive electrode sheet 121, in which the positive current collecting foil 122 and the positive active material layers 123, 123 are present in the thickness direction of the positive electrode sheet 121 is referred to as a positive electrode part 121w. In a finished state of the wound electrode body 120, the whole region of this positive electrode part 121w faces a negative electrode part 131w mentioned later of the negative electrode sheet 131 through the separators 141 (see FIG. 3). In association with the presence of the positive electrode part 121w of the positive electrode sheet 121, an end portion of the positive current collecting foil 122 on one side (upper side in FIG. 3) in a width direction forms a positive current collecting part 121m that extends in a strip shape in the longitudinal direction and that is not provided with the positive active material layers 123 in the thickness direction. A part of this positive current collecting part 121m in the width direction protrudes from the separators 141 in a spiral form on one side SA along the axis line AX and is connected to the above positive electrode terminal 150.

The negative electrode sheet 131 includes a strip-shaped negative current collecting foil 132 made of a copper foil. Of both main surfaces of this negative current collecting foil 132, regions which are part in a width direction and extending a longitudinal direction are provided with strip-shaped negative active material layers 133, 133 in the longitudinal direction (in the right-and-left direction in FIG. 3). Those negative active material layers 133 are each formed of negative active material particles 135, a binder, and a thickening agent. In the first embodiment, the binder is styrene-butadiene copolymer (SBR), and the thickening agent is carboxymethyl cellulose (CMC).

Each of the negative active material layers 133 in the first embodiment contains, as the negative active material particles 135, graphite particles 135a made of graphite (spheroidized graphite carbon in the first embodiment) and amorphous carbon particles 135b made of amorphous carbon (low-temperature calcined cokes in the first embodiment). The graphite particles 135a have a specific surface area Sa of 1.0 to 8.0 m$^2$/g (Sa=4.6 m$^2$/g in the first embodiment) as measured by the BET method. The amorphous carbon particles 135b have a specific surface area SB of 2.0 to 10.0 m$^2$/g (Sb=5.8 m$^2$/g in the first embodiment) as measured by the BET method. A difference $\Delta S$ (=Sb−Sa) between the specific surface area Sb of the amorphous carbon particles 135b and the specific surface area Sa of the graphite particles 135a falls within a range of −0.3 to 2.6 m$^2$/g and further a range of 0 to 2.1 m$^2$/g ($\Delta S$=1.2 m$^2$/g in the first embodiment). A mixing ratio (a weight ratio) between the graphite particles 135*a* and the amorphous carbon particles 135*b* is 70:30. The "specific surface area" is calculated by JIS K6217-2 (Carbon black for rubber industry—Fundamental characteristics—2: Determination of specific surface area—Nitrogen adsorption methods—Single-point procedures).

A strip-shaped portion of the negative electrode sheet 131, in which the negative current collecting foil 132 and the negative active material layers 133, 133 are present in the thickness direction of the negative electrode sheet 131 is referred to as a negative electrode part 131*w*. In the finished state of the wound electrode body 120, the whole region of this negative electrode part 131*w* faces the separators 141. In association with the presence of the negative electrode part 131*w* of the negative electrode sheet 131, an end portion of the negative current collecting foil 132 on one side (lower side in FIG. 3) in the width direction forms a negative current collecting part 131*m* that extends in a strip shape in the longitudinal direction and that is not provided with the negative active material layers 133 in the thickness direction. A part of this negative current collecting part 131*m* in the width direction protrudes from the separators 141 in a spiral form on the other side SB along the axis line AX and is connected to the above negative electrode terminal 160.

The separators 141 are formed of a porous film made of resin, specifically, polypropylene (PP) and polyethylene (PE), and shaped in a strip form.

Meanwhile, a secondary battery in which only the graphite particles 135*a* are contained as the negative active material particles 135 but the amorphous carbon particles 135*b* are not contained can reduce initial battery resistance and increase initial battery output. However, for example, if a "low-rate cycle test" is performed by repeating charge and discharge at a low rate in a wide SOC range; e.g., discharge at 2 C from SOC 100% to 0% and charge at 2 C from SOC 0% to SOC 100%, a battery capacity is greatly decreased. On the other hand, a secondary battery containing only the amorphous carbon particles 135*b* as the negative active material particles 135 without containing the graphite particles 135*a* can restrain a decrease in battery capacity when the secondary battery is subjected to the above "low-rate cycle test", whereas initial battery resistance is increased and initial battery output is decreased.

Different from the above secondary batteries, the secondary battery 100 of the first embodiment includes the negative active material layers 133 containing the negative active material particles 135 made of the graphite particles 135*a* and the amorphous carbon particles 135*b* as described above. The graphite particles 135*a* are higher in electric conductivity than the amorphous carbon particles 135*b*. Accordingly, the secondary battery 100 containing the graphite particles 135*a* in the negative active material particles 135 provides low initial battery resistance and high initial battery output. This secondary battery 100 further contains the amorphous carbon particles 135*b* in the negative active material particles 135 and thus can restrain a decrease in battery capacity even after it is subjected to the above "low-rate cycle test".

However, if the difference $\Delta S$ (Sb−Sa) between the specific surface area Sb of the amorphous carbon particles 135*b* and the specific surface area Sa of the graphite particles 135*a* is too small (concretely, $\Delta S < -0.3$ m$^2$/g) or too large (concretely, $\Delta S > 2.6$ m$^2$/g), the battery resistance is likely to greatly increase when the above "high-rate discharge cycle test" is conducted.

The reason thereof is conceivable as below. Specifically, by comparing the graphite particles 135*a* and the amorphous carbon particles 135*b* under the condition of the same specific surface area (Sa=Sb), the graphite particles 135*a* exhibit higher reactivity than the amorphous carbon particles 135*b*. Thus, if the difference in specific surface area is $\Delta S < -0.3$ m$^2$/g, the reactivity of the graphite particles 135*a* in the negative active material layers 133 become excessively higher than the reactivity of the amorphous carbon particles 135*b*. At the time of high-rate discharge in the "high-rate discharge cycle test", accordingly, the graphite particles 135*a* advance reaction, whereas the amorphous carbon particles 135*b* hardly react, that is, "variations in reaction rate (reaction unevenness)" are caused. If charge and discharge including high-rate discharge are repeated in a state where the "reaction unevenness" is likely to occur, an SEI coating or layer is gradually formed on the graphite particles 135*a* easy to react. Since the SEI coating has low electric conductivity, it is conceived that the resistance of the negative active material layers 133 and the negative electrode sheet 131 becomes higher as the SEI coating is increased, and hence the battery resistance also becomes higher.

On the other hand, if the difference in specific surface area is $\Delta S > 2.6$ m$^2$/g, to the contrary, the reactivity of the amorphous carbon particles 135*b* in the negative active material layers 133 is too high as compared to the reactivity of the graphite particles 135*a*. Accordingly, at the time of the high-rate discharge, the amorphous carbon particles 135*b* advance reaction, whereas the graphite particles 135*a* hardly react, that is, "reaction unevenness" is caused. If charge and discharge including high-rate discharge are repeated in a state where the "reaction unevenness" is likely to occur, SEI coating is gradually formed on the amorphous carbon particles 135*b* easy to react. In this case, it is also conceived that the resistance of the negative active material layers 133 and the negative electrode sheet 131 becomes higher as the SEI coating is increased, and hence the battery resistance also becomes higher.

In the secondary battery 100 of the first embodiment, different from the above, the difference $\Delta S$ (m$^2$/g) in specific surface area is set to $-0.3 \leq \Delta S \leq 2.6$, as described above. When the difference $\Delta S$ in specific surface area falls within this range, the difference in reactivity is sufficiently small between the graphite particles 135*a* and the amorphous carbon particles 135*b* in the negative active material layers 131. Accordingly, during the high-rate discharge, the graphite particles 135*a* and the amorphous carbon particles 135*b* react equally in a balanced manner (the above "reaction unevenness" is less likely to occur). Even when charge and discharge including high-rate discharge are repeated, therefore, the SEI coating is hardly formed on the negative active material particles 135 (the graphite particles 135*a* or the amorphous carbon particles 135*b*). Consequently, even when charge and discharge including high-rate discharge are repeated, the battery resistance of the secondary battery 100 is less likely to increase and thus the durability of the secondary battery 100 can be improved.

In the first embodiment, particularly, the $\Delta S$ (m$^2$/g) in specific surface area is set to a narrower range of $0 \leq \Delta S \leq 2.1$. This further reduces the difference in reactivity between the graphite particles 135*a* and the amorphous carbon particles 135*b* in the negative active material layers 133. Accordingly, during high-rate discharge cycle, the difference in reactivity between the graphite particles 135*a* and the amorphous carbon particles 135*b* is further reduced. Even when the charge and discharge including high-rate discharge are repeated, therefore, it is possible to effectively restrain formation of the SEI coating on the negative active material particles 135 and effectively suppress an increase in battery resistance.

In the first embodiment, the specific surface area Sa of the graphite particles 135a is set to 1.0 to 8.0 m$^2$/g. Accordingly, when charge and discharge including high-rate discharge are repeated, the reaction unevenness more hardly occurs. This can more effectively restrain formation of the SEI coating on the negative active material particles 135 and more effectively suppress an increase in battery resistance. Further, the specific surface area Sb of the amorphous carbon particles 135b is set to 2.0 to 10.0 m$^2$/g. Accordingly, when charge and discharge including high-rate discharge are repeated, it is possible to more effectively restrain formation of the SEI coating on the negative active material particles 135 and more effectively suppress an increase in battery resistance.

A method for producing the above secondary battery 100 will be explained below. The positive electrode sheet 121 is first produced. Specifically, the positive current collecting foil 122 made of a strip-shaped aluminum foil is prepared. To one of main surfaces of this foil 122, a positive active material paste containing the positive active material particles, the conductive material, and the binder is applied by leaving the strip-shaped positive current collecting part 121m extending in the longitudinal direction uncoated. This paste is dried by hot air to form the strip-shaped positive active material layer 123. Similarly, to the other main surface of the positive current collecting foil 122, the positive active material paste is applied by leaving the strip-shaped positive current collecting part 121m uncoated. This paste is then dried by hot air to form the strip-shaped positive active material layer 123. Thereafter, to improve the electrode density, the positive active material layers 123, 123 are compressed by pressure rolls. Thus, the positive electrode sheet 121 is formed (see FIG. 3).

Figure 4:
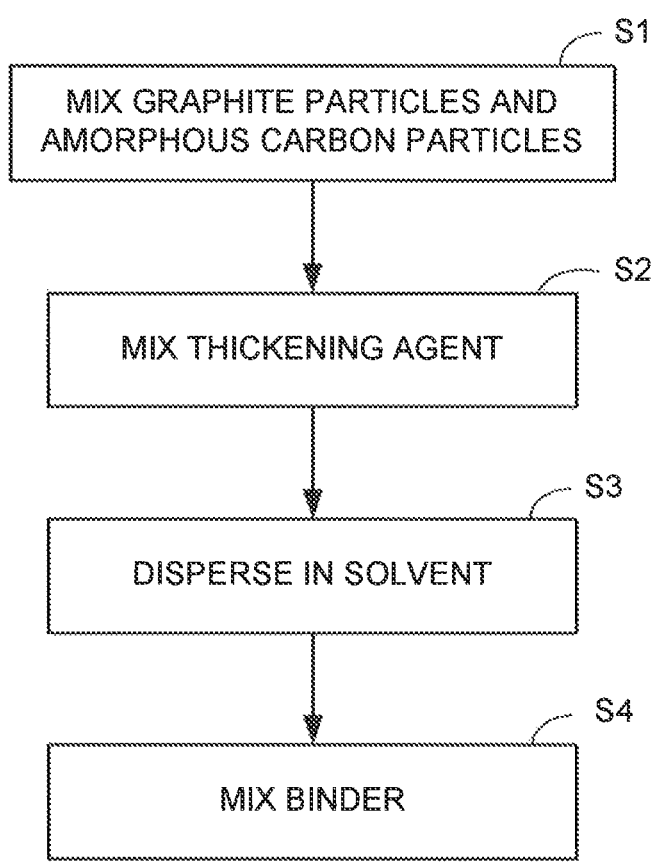
FIG. 4 is a flowchart to explain a preparation step of a negative active material paste in the first embodiment.

In a separate process, the negative electrode sheet 131 is produced. Specifically, the negative current collecting foil 132 made of a strip-shaped copper foil is prepared. On the other hand, in a negative active material paste preparing process, a negative active material paste containing the negative active material particles 135, the binder, and the thickening agent is prepared (see FIG. 4). In an active material mixing step S1, the graphite particles 135a and the amorphous carbon particles 135b are uniformly mixed by use of a biaxial kneader, producing a mixture of negative active material particles 135. In a thickening agent mixing step S2, thereafter the thickening agent (CMC in the first embodiment) is further added and mixed with this mixture of negative active material particles 135.

In a solvent dispersing step S3, a solvent (water in the first embodiment) is added to the mixture of negative active material particles 135 added with the thickening agent so that the negative active material particles 135 and the thickening agent are uniformly dispersed in water. To be concrete, a small amount of water is added to the mixture of negative active material particles 135 added with the thickening agent, this mixture is stiffly kneaded, and then a remaining amount of water is added thereto to dilute, thereby uniformly dispersing the negative active material particles 135 and the thickening agent in water into a paste material. In a binder mixing step S4, this mixture is further mixed with the binder (SBR in the first embodiment). Thus, the negative active material paste is completed. It is to be noted that the thickening agent mixing step S2, the solvent dispersing step S3, and the binder mixing step S4 correspond to the "pasting step".

In a negative electrode sheet forming process, the negative active material layers 133 are formed by use of the above negative active material paste, thereby forming the negative electrode sheet 131. To be concrete, the negative active material paste is applied to one of the main surfaces of the negative current collecting foil 132 by leaving the strip-shaped negative current collecting part 131m extending in the longitudinal direction uncoated, the paste is then dried by hot air, forming the strip-shaped negative active material layer 133. Similarly, the negative active material paste is applied to the other main surface of the negative current collecting foil 132 by leaving the strip-shaped negative current collecting part 131m uncoated, the paste is then dried by hot air, forming the strip-shaped negative active material layer 133. Thereafter, to improve the battery density, the negative active material layers 133, 133 are compressed by pressure rolls. Thus, the negative electrode sheet 131 is completed (see FIG. 3).

Subsequently, a battery assembling step is performed. Specifically, the strip-shaped separators 141 are prepared, the positive electrode sheet 121 and the negative electrode sheet 131 are overlapped by interposing the separators 141 therebetween (see FIG. 3), and they are wound together around a winding core about the axis line AX. Then, this assembly is compressed into a flat shape to form the wound electrode body 120 (see FIG. 2). This wound electrode body 120 is put in the battery case 110, and the positive terminal 150 and the negative terminal 160 are fixed to the battery case 110. Further, the non-aqueous electrolyte 117 is poured in the battery case 110. The secondary battery 100 is thus completed.

In the method for producing the secondary battery 100 in the first embodiment, as described above, when the negative active material paste is to be prepared (in the negative active material paste preparing step), the graphite particles 135a and the amorphous carbon particles 135b are mixed in advance to produce a mixture of negative active material particles 135 (the active material mixing step S1). Thereafter, the negative active material particles 135 are made into paste to produce the negative active material paste (the pasting steps S2 to S4). The negative active material paste prepared in this way is applied to form the negative active material layers 133, and the negative electrode sheet 131 is produced (the negative electrode sheet forming step).

According to the above producing method, it is possible to easily prepare the negative active material paste in which the graphite particles 135a and the amorphous carbon particles 135b uniformly dispersed in the solvent. Accordingly, this method can easily produce the negative electrode sheet 131 including the negative active material layers 133 containing the graphite particles 135a and the amorphous carbon particles 135b uniformly dispersed therein and also the secondary battery 100 including the negative electrode sheet 131.

EXAMPLES

Next, the results of various tests performed to verify the advantageous effects of the present invention are explained below. In Example 1 of the present invention, the secondary battery 100 of the aforementioned first embodiment is prepared. In this secondary battery, as described above, the specific surface area of the graphite particles 135a is Sa=4.6 m$^2$/g, the specific surface area of the amorphous carbon particles 135b is Sb=5.8 m$^2$/g, and the difference in specific surface area is $\Delta$S=Sb−Sa=1.2 m$^2$/g.

A secondary battery prepared in Example 2 is identical to the secondary battery of the first embodiment excepting that the specific surface area Sb of the amorphous carbon particles 135b is 4.3 m$^2$/g. In this secondary battery, the difference in specific surface area between the specific surface area Sb of the amorphous carbon particles 135b and the specific surface area Sa of the graphite particles 135a is $\Delta$S=Sb−Sa=−0.3 m$^2$/g.

In Example 3, the specific surface area Sb of the amorphous carbon particles 135b is 4.6 m$^2$/g. In Example 4, the specific surface area Sb is 5.0 m²/g. In Example 5, the specific surface area Sb is 6.7 m²/g. In Example 6, the specific surface area Sb is 7.2 m²/g. Excepting these conditions, the secondary batteries prepared in these examples are identical to the secondary battery of the first embodiment. Specifically, a difference in specific surface area in the secondary battery of Example 3 is ΔS=0 m²/g, a difference in specific surface area in the secondary battery of Example 4 is ΔS=0.4 m²/g, a difference in specific surface area in the secondary battery of Example 5 is ΔS=2.1 m²/g, and a difference in specific surface area in the secondary battery of Example 6 is ΔS=2.6 m²/g.

On the other hand, a secondary battery prepared in Comparative example 1 is identical to that of the first embodiment excepting that the negative active material particles 135 contain only the graphite particles 135a without containing the amorphous carbon particles 135b. A secondary battery prepared in Comparative example 2 is identical to that of the first embodiment excepting that the negative active material particles 135 contain only the amorphous carbon particles 135b without containing the graphite particles 135a.

In Comparative example 3, a specific surface area Sb of the amorphous carbon particles 135b is 3.9 m²/g. In Comparative example 4, a specific surface area Sb of the amorphous carbon particles 135b is 7.9 m²/g. Excepting these conditions, the secondary batteries prepared in these comparative examples are identical to the secondary battery of the first embodiment. A difference in specific surface area in the secondary battery of Comparative example 3 is ΔS=−0.7 m²/g, and a difference in specific surface area in the secondary battery of Comparative example 4 is ΔS=3.3 m²/g.

The aforementioned secondary batteries of Examples 1 to 6 and Comparative examples 1 to 4 are respectively subjected to measurement of initial DC resistance. To be concrete, the impedance of each secondary battery is measured under an environmental temperature of 25° C. In a cole-cole plot, a distance from the origin to an intercept with x-axis refers to DC resistance. This result is shown in FIG. 5.

Figure 5:
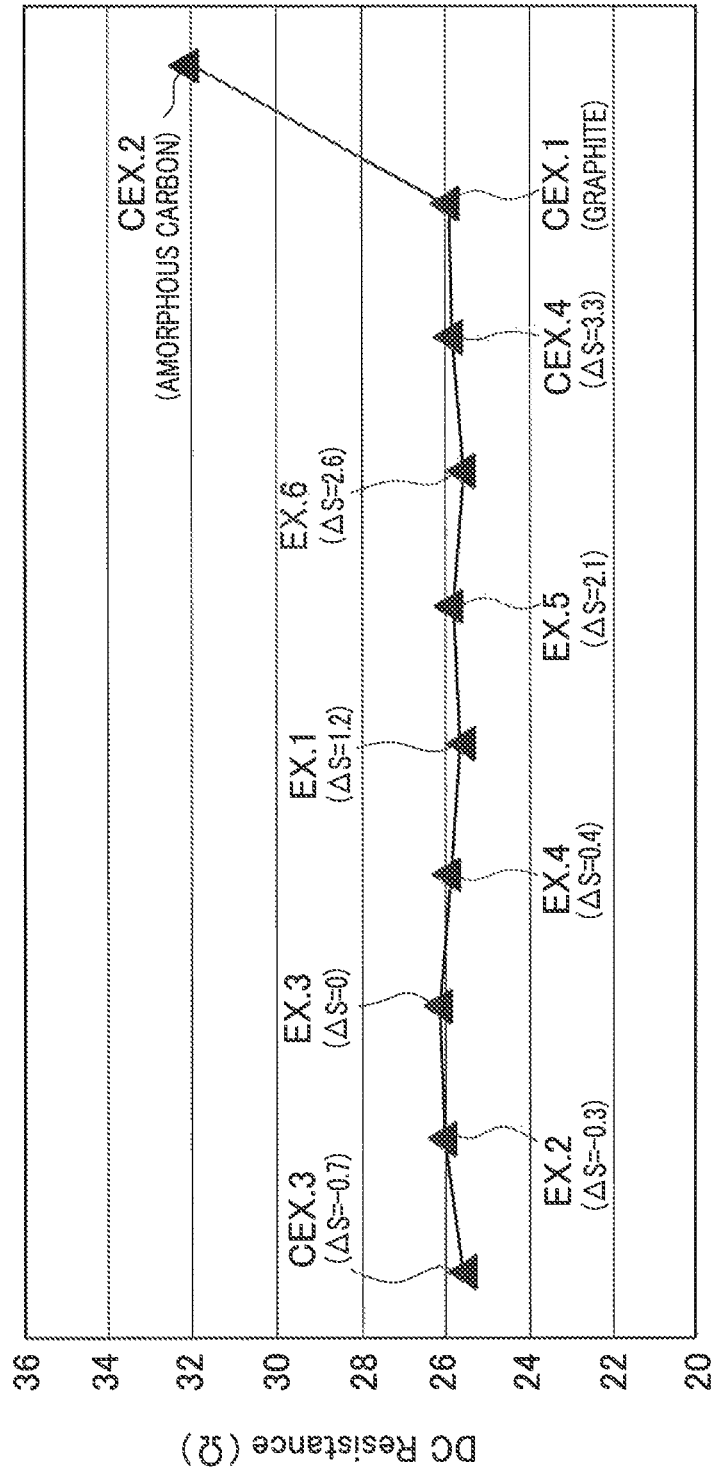
FIG. 5 is a graph showing DC resistance at initial stage of each lithium ion secondary battery in Examples 1 to 6 and Comparative examples 1 to 4.

A graph in FIG. 5 shows that each of the secondary batteries of Examples 1 to 6 and Comparative examples 3 and 4 in which the negative active material particles 135 contain the graphite particles 135a and the amorphous carbon particles 135b and the secondary battery of Comparative example 1 in which the negative active material particles 135 contain only the graphite particles 135a all exhibit a DC resistance of about 26Ω. This resistance value is sufficiently lower than the DC resistance (about 32Ω) of the secondary battery of Comparative example 2 in which the negative active material particles 135 contain only the amorphous carbon particles 135b without containing the graphite particles 135a. These results reveal that: when the negative active material particles 135 contain only the amorphous carbon particles 135b without containing the graphite particles 135a, the DC resistance of the secondary battery is high, whereas when the graphite particles 135a are contained as at least part of the negative active material particles 135, the DC resistance of the secondary battery can be kept low.

The conceivable reasons for the above result are as below. Specifically, the amorphous carbon particles 135b are lower in electrical conductivity than the graphite particles 135a. Thus, in the secondary battery of Comparative example 2 in which the negative active material particles 135 contain only the amorphous carbon particles 135b without containing the graphite particles 135a, the resistances of the negative active material layers 133 and the negative electrode sheet 131 are high and hence the DC resistance of the secondary battery is also high. In each of the secondary batteries of Examples 1 to 6 and Comparative examples 1, 3, and 4 in which the graphite particles 135a are contained in the negative active material particles 135, it is conceived that the presence of the graphite particles 135a higher in electrical conductivity than the amorphous carbon particles 135b in the negative active material layers 133 reduces the resistances of the negative active material layers 133 and the negative electrode sheet 131 and also decreases the DC resistance of the secondary battery.

Next, each of the aforementioned secondary batteries of Examples 1 to 6 and Comparative examples 1 to 4 is subjected to the following "low-rate cycle test". Concretely, each secondary battery is charged at 2 C from SOC 0% to 100% under an environmental temperature of 60° C. Successively, each secondary battery is discharged at 2 C from SOC 100% to 0%. This charge and discharge pattern is assumed as one cycle. This cycle is repeated 1000 times, i.e., 1000 cycles. Then, the battery capacity is measured and a capacity retention rate (%) to the battery capacity obtained before the test is calculated. This result is shown in FIG. 6.

Figure 6:
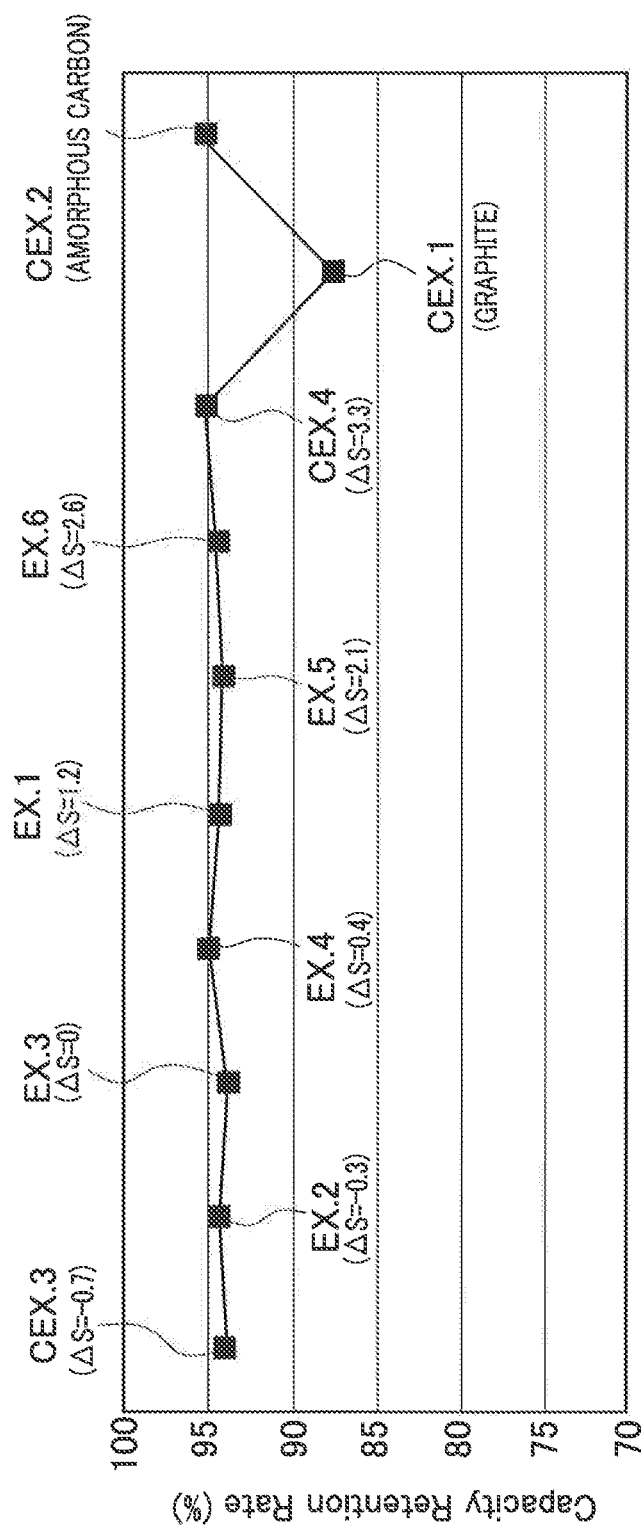
FIG. 6 is a graph showing capacity retention rate after a "low-rate cycle test" of each lithium secondary battery in Examples 1 to 6 and Comparative examples 1 to 4.

The graph in FIG. 6 shows that each of the secondary batteries of Examples 1 to 6 and Comparative examples 3 and 4 in which the negative active material particles 135 contain the graphite particles 135a and the amorphous carbon particles 135b and the secondary battery of Comparative example 2 in which the negative active material particles 135 contain only the amorphous carbon particles 135b all exhibit a capacity retention rate of about 95%. This capacity retention rate is sufficiently higher than the capacity retention rate (about 88%) of the secondary battery of Comparative example 1 in which the negative active material particles 135 contain only the graphite particles 135a without containing the amorphous carbon particles 135b. These results reveal that: when the negative active material particles 135 contain only the graphite particles 135a without containing the amorphous carbon particles 135b, the capacity retention rate after the "low-rate cycle test" is low, whereas when the amorphous carbon particles 135b are contained as at least part of the negative active material particles 135, the capacity retention rate after the "low-rate cycle test" can be kept high.

The conceivable reasons for the above result are as below. Specifically, the graphite particles 135a largely expand and contract by insertion and release of lithium ions in association with charge and discharge as compared to the amorphous carbon particles 135b. On the other hand, charging a secondary battery causes the SEI coating to be formed on the negative active material particles 135 as explained above. If the particles largely expand and contract during charge and discharge, the SEI coating is apt to be cracked. If the SEI coating is cracked, SEI coating is newly formed in such a cracked portion. Thus, the total amount of SEI coating is gradually increased. Accordingly, in the secondary battery of Comparative example 1 containing only the graphite particles 135a in the negative active material particles 135, the battery capacity is decreased by repeated charge and discharge. In each of the secondary batteries of Examples 1 to 6 and Comparative examples 2 to 4 each containing the amorphous carbon particles 135b in the negative active material particles 135, respective battery capacities seem to hardly decrease even when charge and discharge are repeated.

Each of the aforementioned secondary batteries of Examples 1 to 6 and Comparative examples 1 to 4 is subjected to the following "high-rate discharge cycle test". Concretely, each secondary battery in a full charged state is discharged at 30 C for 10 seconds under an environmental temperature of 25° C. Successively, each secondary battery is charged at 30 C for 10 seconds. This charge and discharge pattern is assumed as one cycle. This cycle is repeated 1000 times, i.e., 1000 cycles. Then, the DC resistance of each secondary battery is measured in the above manner and a resistance increasing rate (%) to the DC resistance obtained before the test is calculated. This result is shown in FIG. 7.

Figure 7:
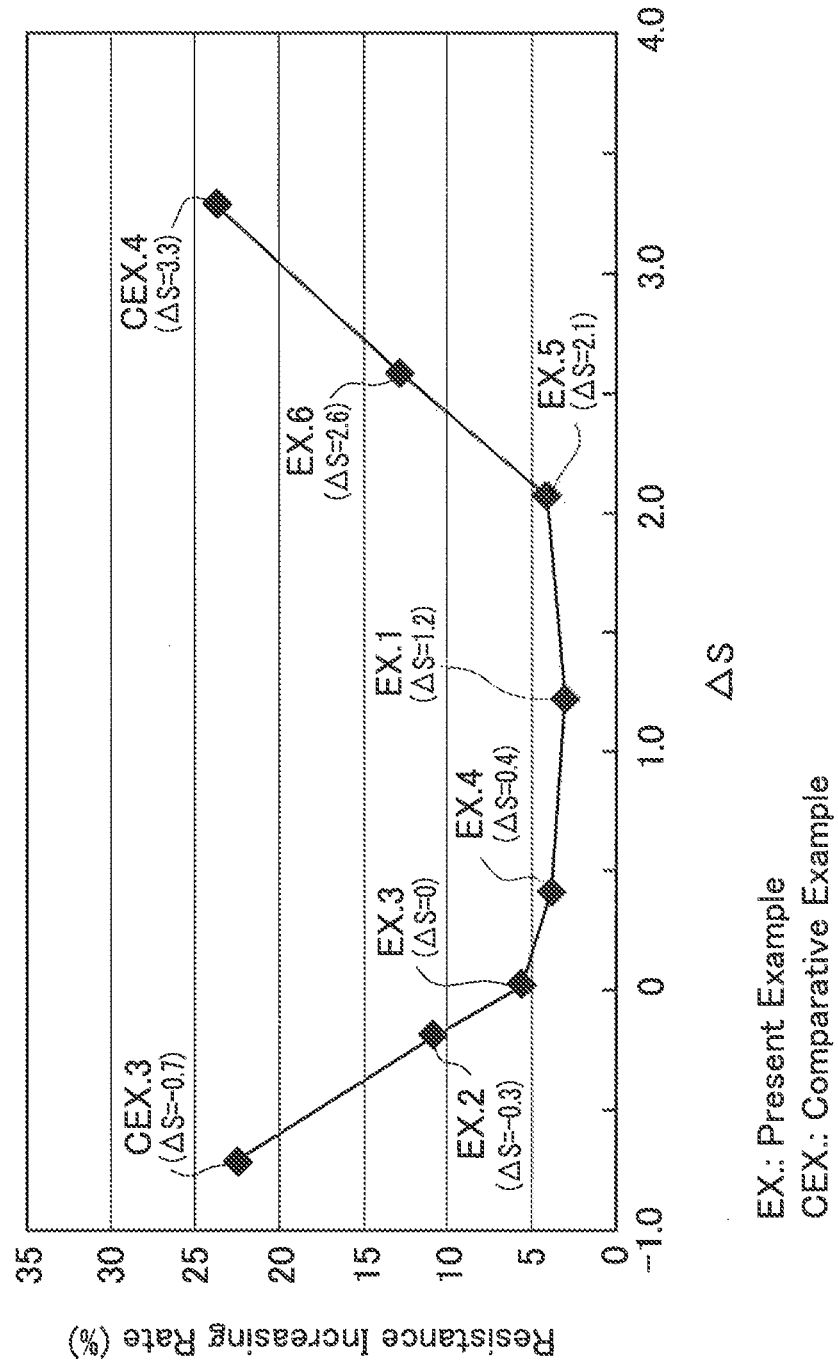
FIG. 7 is a graph showing resistance increasing rate of DC resistance after the "high-rate discharge cycle test" of each lithium secondary battery in Examples 1 to 6 and Comparative examples 3 and 4.

The graph in FIG. 7 shows that each of the secondary batteries of Examples 1 to 6 all exhibit a resistance increasing rate below 15%, which is sufficiently lower than that of each secondary battery of Comparative examples 3 and 4. Especially, the resistance increasing rate of each of the secondary batteries of Examples 1, and 3 to 5 is as very low as about 5%. This result reveals that, when the difference $\Delta S$ between the specific surface area Sb of the amorphous carbon particles 135$b$ and the specific surface area Sa of the graphite particles 135$a$ is set to a range of −0.3 to 2.6 m$^2$/g (Examples 1 to 6), the resistance increasing rate after the "high-rate discharge cycle test" can be kept low. On the other hand, when the difference $\Delta S$ in specific surface area is smaller than −0.3 m$^2$/g (Comparative example 3) or larger than 2.6 m$^2$/g (Comparative example 4), the resistance increasing rate after the "high-rate discharge cycle test" is high. Further, when the difference $\Delta S$ in specific surface area is set to a range of 0 to 2.1 m$^2$/g (Examples 1, 3 to 5), the resistance increasing rate after the "high-rate discharge cycle test" can be kept low.

The conceivable reasons for the above result are as below. Specifically, if the difference $\Delta S$ in specific surface area is smaller than −0.3 m$^2$/g, the reactivity of the graphite particles 135$a$ in the negative active material layers 133 is too higher than the reactivity of the amorphous carbon particles 135$b$, so that the graphite particles 135$a$ advance reaction during high-rate discharge in the "high-rate discharge cycle test", whereas the amorphous carbon particles 135$b$ hardly react, causing "reaction unevenness". If charge and discharge including high-rate discharge are repeated in a state where the "reaction unevenness" is likely to occur, SEI coating is gradually formed on the graphite particles 135$a$ easy to react. Since the SEI coating has low electric conductivity, it is conceived that the resistance of the negative active material layers 133 and the negative electrode sheet 131 becomes higher as the SEI coating is increased, and hence the DC resistance of the secondary battery also becomes higher.

On the other hand, if the difference $\Delta S$ in specific surface area is larger than 2.6 m$^2$/g, inversely, the reactivity of the amorphous carbon particles 135$b$ in the negative active material layers 133 is too higher than the reactivity of the graphite particles 135$a$, so that the amorphous carbon particles 135$b$ advance reaction during high-rate discharge, whereas the graphite particles 135$a$ hardly react, causing "reaction unevenness". If charge and discharge including high-rate discharge are repeated in a state where the "reaction unevenness" is likely to occur, SEI coating is gradually formed on the amorphous carbon particles 135$b$ easy to react. In this case, it is also conceived that the resistance of the negative active material layers 133 and the negative electrode sheet 131 becomes higher as the SEI coating is increased, and hence the DC resistance of the secondary battery also becomes higher.

To the contrary, if the difference $\Delta S$ in specific surface area falls in a range of −0.3 to 2.6 m$^2$/g, particularly, 0 to 2.1 m$^2$/g, (Examples 1, and 3 to 5), the difference in reactivity between the graphite particles 135$a$ and the amorphous carbon particles 135$b$ in the negative active material layers 133 is sufficiently small. Accordingly, during the high-rate discharge, the graphite particles 135$a$ and the amorphous carbon particles 135$b$ react equally in a balanced manner (the "reaction unevenness" is less likely to occur). Even when charge and discharge including high-rate discharge are repeated, therefore, the SET coating is not likely to be formed on the graphite particles 135$a$ or the amorphous carbon particles 135$b$. Thus, the DC resistance of each secondary battery is less likely to increase.

Moreover, in the secondary battery of Comparative example 1 containing only the graphite particles 135$a$ as the negative active material particles 135 and the secondary battery of Comparative example 2 containing only the amorphous carbon particles 135$b$ as the negative active material particles 135, the resistance increasing rate after the "high-rate discharge cycle test" is low. Concretely, the secondary battery of Comparative example 1 exhibits a resistance increasing rate of about 7% and the secondary battery of Comparative example 2 exhibits a resistance increasing rate of about 8%. However, after the secondary battery of Comparative example 1 is subjected to the "low-rate cycle test", the capacity retention rate thereof becomes low (see FIG. 6). The secondary battery of Comparative example 2 has high initial DC resistance (see FIG. 5).

Second Embodiment

A second embodiment will be explained below. A vehicle 700 of the second embodiment mounts the lithium ion batteries 100 of the first embodiment and uses electric energy stored in the batteries 100 as the whole or part of drive energy of a drive source.

Figure 8:
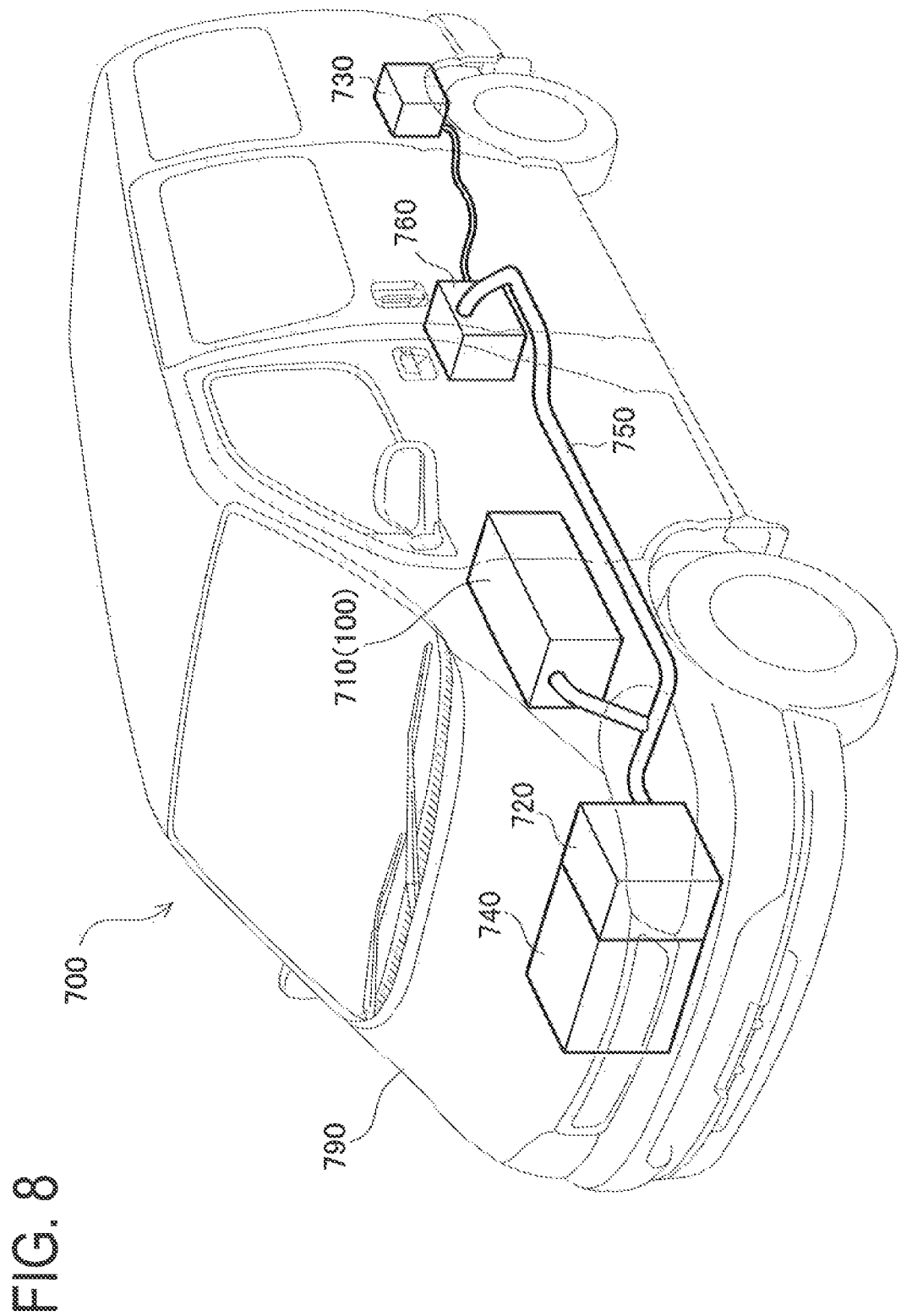
FIG. 8 is an explanatory view showing a vehicle in a second embodiment.

This vehicle 700 is a hybrid car that mounts a plurality of the batteries 100, 100, . . . , and is driven by use of an engine 740, a front motor 720, and a rear motor 730 in combination, as shown in FIG. 8. Specifically, this hybrid car 700 includes a car body 790, the engine 740, the front motor 720 attached to the engine 740, the rear motor 730, a cable 750, and an inverter 760. This vehicle 700 further includes an assembled battery 710 internally including the secondary batteries 100, 100, . . . , and is configured to drive the front motor 720 and the rear motor 730 by using the electric energy stored in the assembled battery 710. As explained above, each battery 100 can provide large battery output and also achieve good durability. The hybrid car 700 mounting this secondary battery can also achieve improved performance and durability.

Third Embodiment

A third embodiment will be explained below. A battery-using device 800 of the third embodiment mounts the lithium ion battery 100 of the first embodiment and is configured to use this secondary battery 100 as at least one of energy sources.

Figure 9:
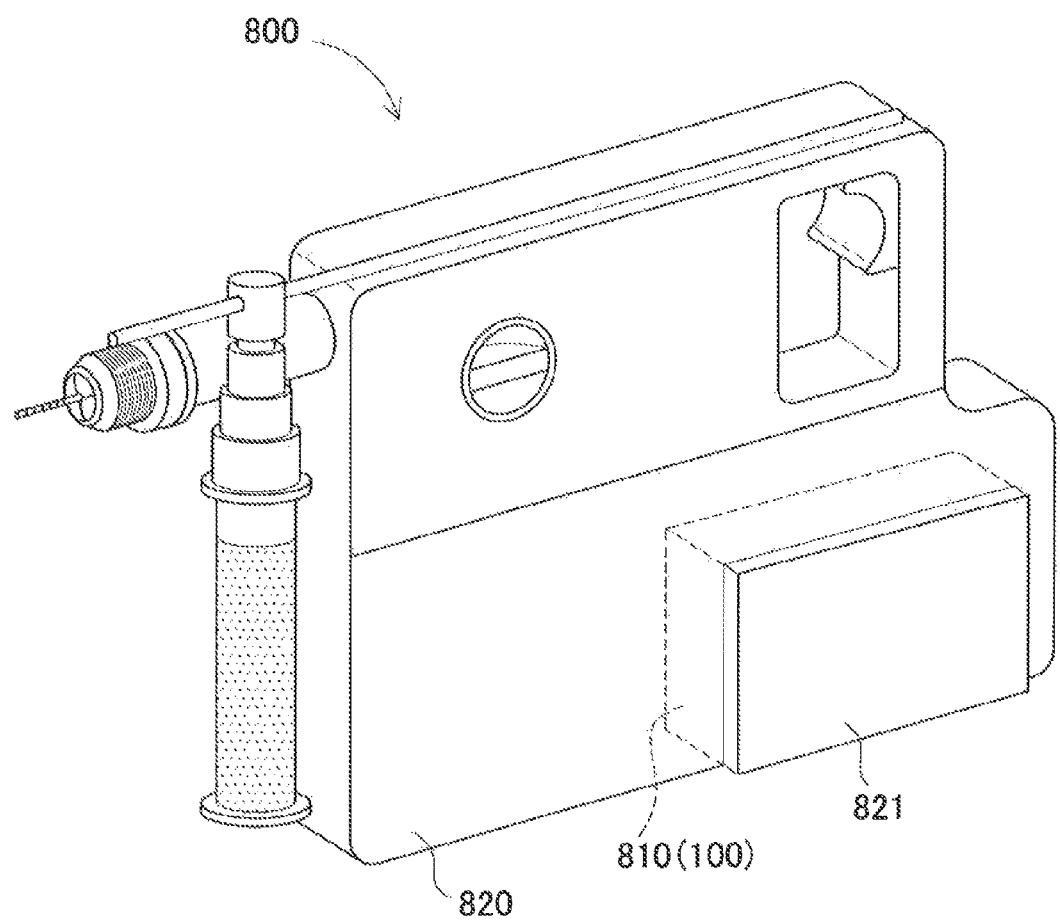
FIG. 9 is an explanatory view showing a hammer drill in a third embodiment.

This battery-using device 800 is a hammer drill as shown in FIG. 9 that mounts a battery pack 810 including the secondary batteries 100 of the first embodiment. In this hammer drill 800, the battery pack 810 is accommodated on a bottom 831 of a main unit 820. This battery pack 810 is used as an energy source to drive the drill. As explained above, the secondary battery 100 can provide large battery output and also achieve good durability. The hammer drill 800 mounting this secondary battery can also achieve improved performance and durability.

The present invention is explained by the embodiments as above, but is not limited to the above embodiments 1 to 3. Needless to say, the present invention may be embodied in other specific forms without departing from the essential characteristics thereof. For instance, the above embodiments 1 to 3 exemplify, as graphite, the spherical graphite particles made from natural graphite by spheroidization, but the invention is not limited thereto. The natural graphite may include for example flake graphite, vein graphite, and amorphous graphite. Another graphite may include artificial graphite.

In the above first to third embodiments, the amorphous carbon is exemplified by the low-temperature calcined cokes, but is not limited thereto. The amorphous carbon may be hard carbon, for example, in the above first to third embodiments, a mixing ratio (a weight ratio) between the graphite particles 135a and the amorphous carbon particles 135b in the negative active material layers 133 is set to 70:30, but is not limited thereto. This mixing ratio (graphite particles vs amorphous carbon particles) may be changed as needed, but it is preferably set to 5:95 to 95:5, more preferably to 10:90 to 90:10.

In the above first to third embodiments, in the negative active material paste preparing step, additives (concretely, the thickening agent and the binder) are added in the pasting step. To be specific, the thickening agent is added and mixed to a mixture of negative active material particles 135 and then a solvent is further added thereto so that the negative active material particles 135 and the thickening agent are dispersed in the solvent. An alternative may be performed in such a way that the solvent is first added to the mixture of negative active material particles 135, dispersing the negative active material particles 135 in the solvent, and then add and mix the thickening agent thereto. Regarding the binder, on the other hand, the binder is added and mixed after the solvent is added in the mixture containing the negative active material particles 135 and others so that the negative active material particles 135 and others are dispersed in the solvent. An alternative may be performed in such a way as to add the binder to the mixture of negative active material particles 135 and others and then add a solvent thereto so that the negative active material particles 135 and others are dispersed in the solvent. As above, the order of adding additives in the pasting step may be changed appropriately.

In the above second embodiment, a vehicle that mounts the lithium ion secondary batteries 100 of the present invention is shown as the hybrid car 700, but is not limited thereto. The vehicles that mount the lithium ion secondary batteries of the present invention may include electric cars, plug-in hybrid cars, hybrid railway vehicles, fork lifts, electric wheelchairs, electric bicycles, electric scooters.

In the third embodiment, the battery-using device that mounts the lithium ion secondary battery 100 of the present invention is shown by the hammer drill 800, but it is not limited thereto. The battery-using device that mounts the lithium ion secondary battery of the invention may include various battery-powered domestic and office appliances and industrial equipment, such as personal computers, mobile phones, battery-powered electric tools, uninterruptible power supplies.

The invention claimed is:

1. A secondary battery including a negative electrode sheet having a negative active material layer containing negative active material particles, wherein
the negative active material layer contains, as the negative active material particles, graphite particles made of graphite and amorphous carbon particles made of amorphous carbon, and
a specific surface area Sb of the amorphous carbon particles and a specific surface area Sa of the graphite particles are determined so that a difference $\Delta S(=Sb-Sa)$ between the specific surface areas is 0 to 2.1 m$^2$/g, wherein 4.0 m$^2$/g$<$Sa$\leq$8.0 m$^2$/g and 4.0 m$^2$/g$<$Sb$\leq$10.0 m$^2$/g.

2. A method for producing a secondary battery including a negative electrode sheet having a negative active material layer containing negative active material particles, wherein
the negative active material layer contains, as the negative active material particles, graphite particles made of graphite and amorphous carbon particles made of amorphous carbon, and
a specific surface area Sb of the amorphous carbon particles and a specific surface area Sa of the graphite particles are determined so that a difference $\Delta S(=Sb-Sa)$ between the specific surface areas is 0 to 2.1 m$^2$/g, wherein 4.0 m$^2$/g$<$Sa$\leq$8.0 m$^2$/g and 4.0 m$^2$/g$<$Sb$\leq$10.0 m$^2$/g,
wherein the method includes:
a negative active material paste preparing step of preparing a negative active material paste; and
a negative electrode sheet forming step of forming the negative electrode sheet by forming the negative active material layer by use of the negative active material paste,
the negative active material paste preparing step includes:
an active material mixing step of mixing the graphite particles and the amorphous carbon particles to produce a mixture of the negative active material particles; and
a pasting step of making the mixture of the negative active material particles into paste to produce the negative active material paste.

* * * * *